US008017708B2

(12) United States Patent
Nagy et al.

(10) Patent No.: US 8,017,708 B2
(45) Date of Patent: Sep. 13, 2011

(54) NITROSO-MODIFIED ZIEGLER-NATTA CATALYST SYSTEM

(75) Inventors: Sandor Nagy, Naperville, IL (US); Joachim T. M. Pater, Cocomaro di Focomorto (IT); Giampiero Morini, Padova (IT)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 12/587,186

(22) Filed: Oct. 2, 2009

(65) Prior Publication Data

US 2011/0082269 A1     Apr. 7, 2011

(51) Int. Cl.
*C08F 2/00* (2006.01)
*C08F 4/06* (2006.01)
*B01J 31/00* (2006.01)
*B01J 27/24* (2006.01)

(52) U.S. Cl. ........ 526/220; 526/147; 526/217; 526/236; 502/123; 502/124; 502/125; 502/167; 502/200

(58) Field of Classification Search ................. 502/123, 502/124, 167, 200; 526/141, 147, 180, 236, 526/220, 217
See application file for complete search history.

(56) References Cited

U.S. PATENT DOCUMENTS

| | | | |
|---|---|---|---|
| 3,444,149 A * | 5/1969 | Kelly | 526/141 |
| 3,554,992 A * | 1/1971 | Lamb | 526/88 |
| 3,629,222 A * | 12/1971 | Coover et al. | 526/140 |
| 4,136,243 A | 1/1979 | Appleyard et al. | |
| 4,168,358 A | 9/1979 | Harada et al. | |
| 4,298,718 A | 11/1981 | Mayr et al. | |
| 4,399,054 A | 8/1983 | Ferraris et al. | |
| 4,464,518 A | 8/1984 | Iwabuchi et al. | |
| 4,469,648 A | 9/1984 | Ferraris et al. | |
| 4,481,301 A | 11/1984 | Nowlin et al. | |
| 4,495,338 A | 1/1985 | Mayr et al. | |
| 4,518,706 A | 5/1985 | Gessell | |
| 4,699,961 A | 10/1987 | Gessell | |
| 4,829,034 A | 5/1989 | Iiskolan et al. | |
| 4,927,797 A | 5/1990 | Ewen | |
| 5,100,849 A | 3/1992 | Miya et al. | |
| 5,106,926 A | 4/1992 | Eisinger et al. | |
| 5,258,345 A | 11/1993 | Kissin et al. | |
| 5,534,472 A | 7/1996 | Winslow et al. | |
| 5,968,865 A | 10/1999 | Wilson et al. | |
| 6,291,384 B1 | 9/2001 | Mink et al. | |
| 6,436,864 B1 | 8/2002 | Tagge | |
| 6,498,221 B1 | 12/2002 | Nagy | |
| 6,541,592 B1 | 4/2003 | Inagaki et al. | |
| 6,627,710 B1 | 9/2003 | Sacchetti et al. | |
| 6,713,585 B1 | 3/2004 | Mavridis et al. | |
| 6,875,829 B2 | 4/2005 | Nagy | |
| 7,560,521 B2 | 7/2009 | Collin et al. | |

OTHER PUBLICATIONS

Stowell, "tert-Alkyknitroso Compounds. Synthesis Dimerization Equilibria," *J. Org. Chem.*, vol. 36, No. 20, (1971), 3055.
R. Shroff and H. Mavridis, "New Measures of Polydispersity from Rehological Data on Polymer Melts," *J. Appl. Polym. Sci.*, 57, (1995), 1605-1626.
Gooden et al., "C-Nitroso Compounds: Synthesis, Physiochemical Properties and Biological Activities," *Current Topics in Medicinal Chemistry*, 5, (2005), 687-705.

\* cited by examiner

*Primary Examiner* — David W Wu
*Assistant Examiner* — Elizabeth Eng

(57) ABSTRACT

A modified Ziegler-Natta catalyst system, a method for preparing the catalyst system, and a process for polymerizing an olefin in the presence of the catalyst system are disclosed. The catalyst system comprises a titanium compound, an aluminum compound, and a nitroso compound. Improved polyolefin properties, such as high molecular weight, are obtained.

7 Claims, No Drawings

NITROSO-MODIFIED ZIEGLER-NATTA CATALYST SYSTEM

FIELD OF THE INVENTION

This invention relates to a modified Ziegler-Natta catalyst system. The catalyst system includes a nitroso compound, which influences polyolefin properties such as molecular weight.

BACKGROUND OF THE INVENTION

Interest in catalysis continues to grow in the polyolefin industry. Many olefin polymerization catalysts are known, including conventional Ziegler-Natta catalysts. To improve polymer properties, single-site catalysts, in particular metallocenes are beginning to replace Ziegler-Natta catalysts. Single-site catalysts typically require large amounts of expensive activators such as methylalumoxane or salts of non-nucleophilic anions such as triphenylcarbenium tetrakis(pentafluorophenyl)borate. It would be desirable to improve polyolefin properties without the high cost of single-site catalysts and their activators.

Ziegler-Natta catalyst systems are well known in the art. Useful Ziegler-Natta catalysts include titanium compounds and their combinations with aluminum compounds. It is known to support the titanium compound with compounds such as silica or magnesium chloride and considerable research has been done in this area. Known compositions also include an aluminum compound, sometimes referred to as a cocatalyst. Trialkyl aluminums, dialkyl aluminum halides, and alkyl aluminum dihalides are common cocatalysts.

It is known to add other compounds to a Ziegler-Natta catalyst system to influence catalytic properties. Various Lewis bases have been used; they are often referred to as modifiers or electron donors. When the electron donor is added during the preparation of the Ziegler-Natta catalyst system it is sometimes called an "internal donor," while those added during or immediately prior to the polymerization have been called "external donors." A variety of electron donors have been disclosed (for example, see U.S. Pat. No. 4,136,243). Common electron donors include ethers and esters (for example, see U.S. Pat. No. 5,968,865), but many others have been used. U.S. Pat. No. 5,106,926 gives examples of suitable electron donors as alkyl esters of aliphatic or aromatic carboxylic acids, aliphatic ketones, aliphatic amines, aliphatic alcohols, alkyl or cycloalkyl ethers, and mixtures thereof with tetrahydrofuran being preferred. U.S. Pat. No. 4,927,797 discloses the use of silane donors such as methylcyclohexyldimethoxysilane, and U.S. Pat. No. 6,228,792 discloses the use of 2,6-disubstituted pyridines as electron donors. Sometimes two or more electron donors are used. U.S. Pat. No. 7,560,521 teaches a combination of a monofunctional donor selected from ethers, esters, amines, or ketones with a difunctional donor selected from diesters, diketones, diamines, or diethers. U.S. Pat. No. 6,436,864 discloses unsaturated nitrogenous compounds as electron donors. An imine, a diimine, and a methoxymethylpyridine are used in the examples. A nitroso compound is not disclosed.

Chelating N-oxide ligands have been used in constructing single-site catalysts. For example, U.S. Pat. Nos. 6,498,221 and 6,875,829 use chelating N-oxides such as 2-hydroxypyridine N-oxide to synthesize certain single-site catalysts. They are not used with Ziegler-Natta catalyst systems. Nitroso compounds are not used. U.S. Pat. Nos. 4,168,358 and 6,541,592 disclose the use of pyridine N-oxide as an alternative to hydrogen or diethyl zinc to regulate molecular weight in a vanadium-based Ziegler-Natta polymerization.

U.S. Pat. No. 3,444,149 uses nitroso compounds to lower the molecular weight of polymers prepared with vanadium-based Ziegler-Natta catalyst systems. They disclose that the molecular weight may be remarkably reduced and that liquid polymers may be obtained in this way.

The role of donors is not completely understood and remains a subject of continued research. As polyolefin applications become more demanding, there is a continued need for improvements in catalyst systems. Despite the considerable research that has been done in this area, apparently no one has studied nitroso compounds as a component in a titanium-based Ziegler-Natta catalyst system or contemplated that they might be used to increase polyolefin molecular weight.

SUMMARY OF THE INVENTION

In one aspect, the invention is a modified Ziegler-Natta catalyst system and a method for preparing it. In another aspect, the invention is a process for polymerizing an olefin in the presence of the catalyst system. The catalyst system, which comprises a titanium compound, an aluminum compound, and a nitroso compound, enables improved polyolefin properties such as increased molecular weight.

DETAILED DESCRIPTION OF THE INVENTION

The invention relates to a modified Ziegler-Natta catalyst system comprising: (a) a titanium compound; (b) an aluminum compound selected from the group consisting of trialkyl aluminums, dialkyl aluminum halides, alkyl aluminum dihalides, and combinations thereof; and (c) a nitroso compound. The titanium compound can be any compound normally effective as a Ziegler-Natta catalyst. Preferred titanium compounds include titanium halides such as titanium trichloride and titanium tetrachloride, and titanium alkoxides such as titanium(IV) butoxide.

More preferably, titanium tetrachloride is used. When titanium tetrachloride is used, it is preferably supported on or modified with a magnesium compound. Many magnesium compounds suitable for use in supporting or modifying the Ziegler-Natta catalysts are well known. Examples include magnesium chloride, alkyl magnesium halides, and magnesium siloxanes. For additional examples, see U.S. Pat. Nos. 4,298,718, 4,399,054, 4,495,338, 4,464,518, 4,481,301, 4,518,706, 4,699,961, 5,258,345, 6,291,384, and 7,560,521, the teachings of which are incorporated herein by reference.

Optionally, a Lewis base is included in the catalyst system. Preferred Lewis bases are $C_3$-$C_{24}$ esters such as butyl acetate, diethyl phthalate, trimethyl trimellitate, and diethyl adipate and $C_4$-$C_{16}$ ethers such as dibutyl ether, glyme, and diglyme. More preferred Lewis bases are $C_9$-$C_{24}$ esters such as diethyl phthalate, dioctyl isophthalate, and 1,6-hexanediol bisbenzoate.

In one aspect, the titanium compound is a titanium halide supported on magnesium chloride, and the Lewis base, if any, is present in a Lewis base/Ti molar ratio less than 1. The supported titanium compound preferably has as a porosity ($P_F$) determined with the mercury method higher than 0.3 cm$^3$/g, and typically in the range of 0.50-0.80 cm$^3$/g. The total porosity ($P_T$) is usually in the range of 0.50-1.50 cm$^3$/g, preferably from 0.60-1.20 cm$^3$/g. The surface area measured by the BET method is preferably lower than 80, more preferably from 10 to 70 m$^2$/g. The porosity measured by the BET method is generally from 0.10 to 0.50, preferably from 0.10 to 0.40 cm$^3$/g.

Particles of the magnesium chloride-supported titanium compound preferably have substantially spherical morphology. Average diameters are preferably from 5 to 150 μm, more preferably from 20 to 100 μm. "Substantially spherical" particles are those wherein the ratio between the major axis and minor axis is less than or equal to 1.5, preferably less than 1.3.

The titanium compound preferably has the formula Ti(OR$^{II}$)$_n$X$_{y-n}$, wherein n has a value from 0 to 0.5, y is the valence of titanium, R$^{II}$ is a C$_1$-C$_8$ alkyl, cycloalkyl or aryl radical, and X is halogen. Preferably, R$^{II}$ is ethyl, isopropyl, n-butyl, isobutyl, 2-ethylhexyl, n-octyl, phenyl, or benzyl; X is preferably chlorine. TiCl$_4$ is especially preferred.

One method suitable for preparing the spherical components mentioned above comprises a first step in which a compound MgCl$_2$.mR$^{III}$OH, wherein 0.3≦m≦1.7 and R$^{III}$ is a C$_1$-C$_{12}$ alkyl, cycloalkyl or aryl radical, reacts with the titanium compound of formula Ti(OR$^{II}$)$_n$X$_{y-n}$.

The compounds are conveniently obtained by mixing alcohol and magnesium chloride in the presence of an inert hydrocarbon immiscible with the adduct with stirring at the melting temperature of the adduct (100-130° C.). The emulsion is quickly quenched, and the adduct solidifies as spherical particles. Suitable methods for preparing the spherical adducts are disclosed, e.g., in U.S. Pat. Nos. 4,469,648 and 4,399,054, the teachings of which are incorporated herein by reference. Another useful method for making the spherical components is spray cooling, described, e.g., in U.S. Pat. Nos. 5,100,849 and 4,829,034.

For more examples of suitable titanium compounds and their methods of preparation, see U.S. Pat. Nos. 4,399,054 and 6,627,710, the teachings of which are incorporated herein by reference.

The modified Ziegler-Natta catalyst system includes an aluminum compound selected from the group consisting of trialkyl aluminums, dialkyl aluminum halides, alkyl aluminum dihalides, and combinations thereof. Suitable aluminum compounds include triethylaluminum, tri-isobutylaluminum, diethylaluminum chloride, butylaluminum dichloride, and the like, and mixtures thereof. Trialkyl aluminum compounds are preferred. Preferably, the molar ratio of the aluminum compound to titanium compound is within the range of 0.5:1 to 500:1.

The modified Ziegler-Natta catalyst system includes a nitroso compound. By "a nitroso compound," we mean nitroso compounds, dimers of nitroso compounds, and mixtures of the monomeric and dimeric compounds. The nitroso compound is an alkyl nitroso compound or a non-phenolic aryl nitroso compound. Preferably, the nitroso compound is a C-nitroso compound, i.e., a nitroso compound in which the nitrogen of the nitroso group is bonded to a carbon atom. Also preferred are nitroso compounds in which the nitroso group is attached to a carbon that has no hydrogens attached. More preferably, the nitroso compound has the structure:

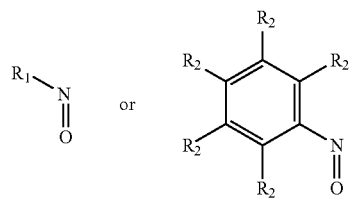

wherein R$_1$ is aliphatic C$_1$-C$_{16}$ hydrocarbyl, each R$_2$ is independently selected from H and C$_1$-C$_{16}$ hydrocarbyl; and wherein two adjacent R$_2$ groups may be joined together to form a ring.

Some examples of suitable nitroso compounds are shown below:

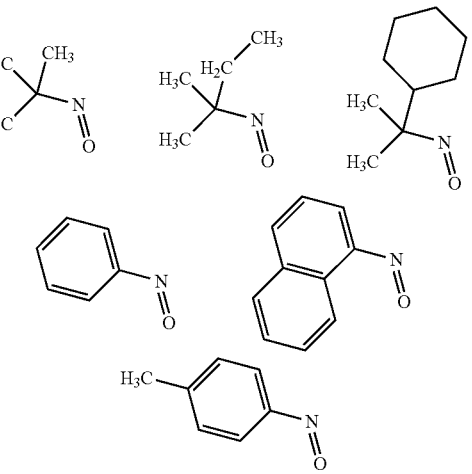

Nitroso compounds can be prepared using a variety of methods known in the art. The nitroso compounds are conveniently prepared by oxidation of an amine or by a variety of nitrosation reactions (see *Current Topics in Medicinal Chemistry* (2005) 687 for a review of aliphatic C-nitroso compounds and their synthesis). Other methods can be used. Depending upon the substituents and the conditions, the nitroso compounds can exist predominantly as the monomer or as the dimer. For example, nitrosobenzene exists as the monomer at 20° C. in a 1 M benzene solution while nitrosocyclohexane under the same conditions exists mainly as the dimer. For a discussion of the dimerization equilibria, see *J. Org. Chem.* 36 (1971) 3055 and references cited therein. Preferably, the molar ratio of the nitroso compound to titanium compound is within the range of 1:1 to 50:1, more preferably from 10:1 to 30:1.

The modified Ziegler-Natta catalyst system is useful for polymerizing olefins. Preferably, the olefin is an α-olefin. Preferred α-olefins are ethylene, propylene, 1-butene, 1-hexene, 1-octene, and mixtures thereof. More preferred are ethylene, propylene, and combinations of ethylene with propylene, 1-butene, 1-hexene, or 1-octene. When ethylene is polymerized in combination with another α-olefin, the modified Ziegler-Natta catalyst system produces polyethylene with good incorporation of the α-olefin. The amount of α-olefin incorporation will depend upon the particular α-olefin and the amount added to the polymerization. The level of α-olefin incorporation can be easily measured by FT-IR spectroscopy. Each molecule of α-olefin incorporated gives one tertiary carbon atom.

The modified Ziegler-Natta catalyst system is useful for preparing polyolefins with increased molecular weight. For some applications, a polyolefin with a high molecular weight, in particular, a high weight average molecular weight ($M_w$) is needed. $M_w$ has a pronounced effect on melt flow properties. One measure of melt flow is melt index (MI) where the amount of polyolefin that flows through an orifice is measured as a function of time. Generally, MI decreases with increasing M. The modified Ziegler-Natta catalyst system is useful for preparing polyolefins with a low MI. Polydispersity is the ratio of weight average molecular weight to number average molecular weight ($M_w/M_n$). For certain applications, a narrow molecular weight distribution (low polydispersity) is desired. It can be difficult to obtain low polydispersity with Ziegler-Natta catalysts, but the modified Ziegler-Natta catalyst system is useful for preparing polyolefins with reduced polydispersity.

Optionally, hydrogen is used to regulate polyolefin molecular weight. The amount of hydrogen needed depends upon the desired polyolefin molecular weight and melt flow properties. Generally, as the amount of hydrogen is increased, the polyolefin molecular weight decreases and the melt index increases.

The polymerizations are normally conducted under pressure. The pressure is preferably in the range of 0.2 MPa to 35 MPa, more preferably from 0.4 MPa to 25 MPa.

Many types of polymerization processes can be used, including gas phase, bulk, solution, or slurry processes. The polymerization can be performed over a wide temperature range. Generally, lower temperatures give higher molecular weight and longer catalyst lifetimes. However, because the polymerization is exothermic, lower temperatures are more difficult and costly to achieve. A balance must be struck between these two factors. Preferably, the temperature is within the range of 0° C. to 150° C. A more preferred range is from 20° C. to 90° C.

Catalyst concentrations used for the olefin polymerizations depend on many factors. Preferably, however, the concentration ranges from 0.01 micromoles titanium compound per liter to 100 micromoles per liter. Polymerization times depend on the type of process, the catalyst concentration, and other factors. Generally, polymerizations are complete within several seconds to several hours.

The modified Ziegler-Natta catalyst system can be made by any suitable method; those skilled in the art will recognize a variety of acceptable synthetic strategies. Each component can be separately added to the polymerization reactor. Preferably, two or more components are combined prior to addition. For example, the nitroso compound may be reacted with the titanium compound prior to addition to the polymerization reactor. In one preferred method, the nitroso compound is reacted with the aluminum compound prior to addition to the reactor. More preferably, the nitroso compound is reacted with the aluminum compound and the reaction mixture is contacted with a titanium compound. This mixture is then added to the polymerization reactor. Most preferably, the nitroso compound is reacted with the aluminum compound and the reaction mixture is contacted with a titanium compound that has been modified by or supported on a magnesium compound, especially magnesium chloride.

The following examples merely illustrate the invention. Those skilled in the art will recognize many variations that are within the spirit of the invention and scope of the claims.

Example 1

Modified Ziegler-Natta Catalyst System

A magnesium chloride and ethanol adduct is prepared following the method described in Example 2 of U.S. Pat. No. 4,399,054, but working at 2000 RPM instead of 10,000 RPM. The adduct is treated thermally under a nitrogen stream, over a temperature range of 50-150° C., until a weight content of 25% of ethanol is reached. In a 2-L four-neck flask, purged with nitrogen, $TiCl_4$ (1 L) is charged at 0° C. followed by the spherical $MgCl_2$/ethanol adduct (70 g). The temperature is raised to 130° C. in 2 hours and maintained for 1 hour. The stirring is discontinued, the solid product is allowed to settle, and the supernatant liquid is removed by siphoning. Fresh $TiCl_4$ is charged to the flask, the temperature is brought to 110° C. and maintained for 60 minutes. The stirring is discontinued, the solid product is allowed to settle, and the supernatant liquid is removed by siphoning. The solid residue is washed once with heptane at 80° C., five times with hexane at 25° C., dried under vacuum at 30° C., and analyzed. The resulting solid contains 3.5% by weight titanium.

2-Methyl-2-nitrosopropane dimer (35 mg, $2 \times 10^{-4}$ mole) is added to a solution of triethylaluminum ($4 \times 10^{-4}$ mole) in hexanes. The solution is stirred for 1 hour and 20 mg ($2 \times 10^{-5}$ mole Ti) of titanium tetrachloride supported on magnesium chloride (prepared as described above) is added. The mixture is stirred for 30 minutes and used as described below in an olefin polymerization.

Example 2

Polymerization

Isobutane (1 L), 1-butene (20 mL), and 1M triethylaluminum solution in hexanes (4 mL) are added to a dry, stainless-steel, 2-L autoclave reactor. The reactor is heated to 80° C. and hydrogen is added from a 300-mL vessel at 4.10 MPa to effect a pressure drop of 0.34 MPa. The reactor is pressurized to 0.7 MPa with ethylene. The polymerization reaction is started by injecting the modified catalyst system from Example 1. The temperature is maintained at 80° C. and ethylene is supplied on demand to maintain the reactor pressure of 0.7 MPa. After 46 minutes, the polymerization is terminated by venting the autoclave. The resulting polyethylene sample is dried and tested.

Yield: 119 g. Activity: 7800 g polyethylene per g supported titanium compound per hour. By GPC, the polyethylene has a weight-average molecular weight ($M_w$) of 186,000 and a $M_w/M_n$ of 5.8. Branching (by FT-IR spectroscopy): 4.3 tertiary carbons per 1000 carbons. Percent crystallinity (by differential scanning calorimetry): 57%. Melt index (MI) by ASTM D-1238, Condition E: 0.33 dg/min. Rheological testing is performed, and ER, an elasticity parameter measured according to ASTM D4440-95A (and as described in U.S. Pat. Nos. 5,534,472 and 6,713,585 and in R. Shroff and H. Mavridis, *J. Appl. Polym. Sci.* 57 (1995) 1605), is 2.6.

Example 3

The polymerization of Example 2 is repeated, but with a catalyst system made by adding 2-methyl-2-nitrosopropane dimer (139 mg, $0.8 \times 10^{-3}$ mole) to a solution of triethylaluminum ($4 \times 10^{-4}$ mole) in hexanes. The solution is stirred for 1 hour and 20 mg ($2 \times 10^{-5}$ mole Ti) of titanium tetrachloride supported on magnesium chloride is added. The mixture is stirred for 30 minutes and used in an olefin polymerization. The results are shown in Table 1.

Example 4

The polymerization of Example 2 is repeated, but with a catalyst system that uses nitrosobenzene (4×10⁻⁴ mole) as a replacement for 2-methyl-2-nitrosopropane dimer. The results are shown in Table 1.

Comparative Example 5

The polymerization of Example 2 is repeated, but with a catalyst system that does not contain a nitroso compound. The system is prepared by adding 20 mg (2×10⁻⁵ mole Ti) of the same titanium compound to a solution of triethylaluminum (4×10⁻⁴ mole) in hexanes. The results are shown in Table 1.

Comparative Example 6

The polymerization of Example 2 is repeated, but with a catalyst system that uses N,N-diethylhydroxylamine (4×10⁻⁴ mole) as a replacement for the nitroso compound. The results are shown in Table 1.

Comparative Example 7

The polymerization of Example 2 is repeated, but with a catalyst system that uses N,O-bis(trimethylsilyl)hydroxylamine (4×10⁻⁴ mole) as a replacement for the nitroso compound. The results are shown in Table 1.

Comparative Example 8

The polymerization of Example 2 is repeated, but with a catalyst system that uses 1-nitroso-2-naphthol (4×10⁻⁴ mole) as a replacement for 2-methyl-2-nitrosopropane dimer. The results are shown in Table 1.

Comparative Example 9

The polymerization of Example 2 is repeated, but with a catalyst system that uses 2-nitroso-1-naphthol (4×10⁻⁴ mole) as a replacement for 2-methyl-2-nitrosopropane dimer. The results are shown in Table 1.

TABLE 1

| | | | | Polymerizations | | | | |
| Ex. | Time (min) | Activity | MI | $M_w$ | $M_w/M_n$ | Branches/ 1000 C | Crystallinity (%) | ER |
| --- | --- | --- | --- | --- | --- | --- | --- | --- |
| 2 | 46 | 7800 | 0.33 | 186,000 | 5.8 | 4.3 | 57 | 2.6 |
| 3 | 63 | 1600 | 0.11 | 248,000 | 6.6 | 4.6 | 55 | 2.6 |
| 4 | 95 | 2600 | 0.52 | 189,000 | 6.6 | 8.0 | 53 | 2.4 |
| C5 | 30 | 8800 | 2.6 | 134,000 | 7.8 | 11.7 | 53 | 2.4 |
| C6 | 63 | 4600 | 1.4 | 139,000 | 6.3 | 11.2 | 47 | 2.1 |
| C7 | 50 | 6000 | 1.6 | 142,000 | 6.5 | 7.7 | 53 | 2.0 |
| C8 | 44 | 6400 | 1.2 | 147,000 | 7.1 | 7.8 | 56 | 2.1 |
| C9 | 53 | 5200 | 0.9 | 138,000 | 6.8 | 8.0 | 51 | 2.1 |

Examples 2-4 show that the use of a nitroso compound provides increased molecular weight. The $M_w$ of these polymers is higher than that of the polyolefin made without nitroso compound (Comparative Example 5). Use of a nitroso compound provides more than a 30% increase in M. There is also a significant decrease in MI to less than 0.9 for Examples 2-4 compared with a MI=2.6 without the nitroso compound (Comparative Example 5). Inspection of Comparative Examples 6 and 7 shows that this is an unexpected result; other similar compounds such as N,N-diethylhydroxylamine and N,O-bis(trimethylsilyl)hydroxylamine provide little to no increase (less than 10%) in $M_w$. Comparative Examples 8 and 9 show that phenolic aryl nitroso compounds also have little effect.

The preceding examples are meant only as illustrations. The following claims define the invention.

We claim:

1. A process for making polyethylene, comprising polymerizing ethylene and an olefin selected from the group consisting of 1-butene, 1-hexene, and 1-octene in the presence of a modified Ziegler-Natta catalyst system, wherein the catalyst system comprises: (a) a titanium compound; (b) an aluminum compound selected from the group consisting of trialkyl aluminums, dialkyl aluminum halides, alkyl aluminum dihalides, and combinations thereof; and (c) one or more aliphatic nitroso compounds; wherein the weight-average molecular weight (Mw) of the polyethylene is increased compared with that of a polyethylene produced using the catalyst system without the nitroso compound.

2. The process of claim 1 wherein the titanium compound is titanium tetrachloride.

3. The process of claim 1 wherein the nitroso compound has the structure:

wherein $R_1$ is aliphatic $C_1$-$C_{16}$ hydrocarbyl.

4. The process of claim 1 wherein the molar ratio of nitroso compound to titanium is from 50:1 to 1:1.

5. The process of claim 1 wherein the modified Ziegler-Natta catalyst system is prepared by a method comprising: (a) reacting a one or more aliphatic nitroso compounds with an aluminum compound selected from the group consisting of trialkyl aluminums, dialkyl aluminum halides, alkyl aluminum dihalides, and combinations thereof; and (b) contacting the reaction mixture from step (a) with a titanium compound.

6. The process of claim 1 wherein the presence of the nitroso compound in the modified Ziegler-Natta catalyst system provides at least a 30% increase in the weight-average molecular weight of the polyethylene.

7. The process of claim 1 wherein said one or more of said nitroso compounds comprises 2-methyl-2-nitrosopropane dimer.

* * * * *